United States Patent
Herrendoerfer et al.

(10) Patent No.: US 6,481,621 B1
(45) Date of Patent: Nov. 19, 2002

(54) SYSTEM METHOD AND ARTICLE OF MANUFACTURE FOR ACCESSING AND PROCESSING SMART CARD INFORMATION

(75) Inventors: Dirk Herrendoerfer, Sindelfingen; Robert Sulzmann, Holzgerlingen; Martin Welsch, Herrenberg, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,406

(22) Filed: Nov. 19, 1999

(30) Foreign Application Priority Data

Jan. 12, 1999 (EP) .............................. 99100473

(51) Int. Cl.⁷ ................................ G06K 5/00
(52) U.S. Cl. ................. 235/380; 235/382; 235/383
(58) Field of Search ................. 235/380, 383, 235/382

(56) References Cited

U.S. PATENT DOCUMENTS

| | | | | |
|---|---|---|---|---|
| 4,794,236 A | * | 12/1988 | Kawana et al. | 235/441 |
| 5,742,845 A | * | 4/1998 | Wagner | 395/831 |
| 5,848,399 A | * | 12/1998 | Burke | 235/385 X |
| 5,889,866 A | * | 3/1999 | Cyras et al. | 380/49 |
| 5,969,318 A | * | 10/1999 | Mackenthun | 235/380 |
| 6,026,377 A | * | 2/2000 | Burke | 235/383 X |
| 6,038,551 A | * | 3/2000 | Barlow et al. | 705/41 |
| 6,105,008 A | * | 8/2000 | Davis et al. | 235/375 |
| 6,115,755 A | * | 9/2000 | Krishan | 709/250 |
| 6,129,276 A | * | 10/2000 | Jelen et al. | 235/383 |
| 6,134,598 A | * | 10/2000 | Raman | 709/246 |
| 6,141,752 A | * | 10/2000 | Dancs et al. | 713/172 |
| 6,179,209 B1 | * | 1/2001 | Goodwin et al. | 235/483 |
| 6,199,753 B1 | * | 3/2001 | Tracy et al. | 235/375 |
| 6,216,956 B1 | * | 4/2001 | Ehlers | 236/47 |

FOREIGN PATENT DOCUMENTS

ES          1021020     * 11/2000

* cited by examiner

Primary Examiner—Thien M. Le
Assistant Examiner—Daniel I. Walsh
(74) Attorney, Agent, or Firm—Louis P. Herzberg

(57) ABSTRACT

A system and method for processing information contained in a smart card (130) uses a local computer (100) on which a proxy server (120) is installed. The local computer is connected to a data communication network (110), such as the Internet, and comprises a network browser which is used to generate access requests to data stored on a smart card and in a local storage (122). The requests are received by an HTTP server (210) and passed to request brokers (214, 215, 216). In response to a request parsing operation access functions (226, 228, 340, 440, 350, 460) are activated for accessing the local storage and a smart card (130). Data read from a smart card may be inserted into a HTML document accessed in the local storage, and data from the local storage or from remote sources may be uploaded to a smart card. Data modifier means (232, 234, 236) are provided to translate data read from the smart card into a data format corresponding to a user interface, and for translating data to be uploaded to said smart card into a predetermined smart card data format. The proxy server may be readily adapted to any smart card data format, and it may provide data security functions and data compression/decompression facilities.

34 Claims, 6 Drawing Sheets

SYSTEM METHOD AND ARTICLE OF MANUFACTURE FOR ACCESSING AND PROCESSING SMART CARD INFORMATION

FIELD OF THE INVENTION

The invention relates to a system for accessing and processing information contained in a smart card. The system comprises a local processor which includes a local storage for storing applications and data and further includes means for accessing information contained in the smart card and in the local storage. The invention also relates to a method for accessing and processing information contained in a smart card and to a program product stored on a data carrier and controlling method steps for accessing and processing information contained in a smart card.

BACKGROUND OF THE INVENTION

The use of Internet browsers is a well established standard presentation technology. It is desirable to exploit this technology for other server based applications as well. A user interface supporting the HyperText Mark-up Language (HTML) is very flexible and relatively easy to maintain. Although the use of browsers for Internet access is now a standard procedure there are few programs making use of this technology on a local basis. Internet proxy servers are usually set up at the concentration points of networks to speed up HyperText Transfer Protocol (HTTP) access to the Internet and are usually not located on the computer of the user (A. Lutonen, "Web Proxy Servers", Prentice Hall, Inc., Englewood Cliffs, USA, 1997, ISBN: 0136806120).

Smart cards are widely used as personal data carriers, and the integration of smart cards into Internet applications is desired. However, access to data stored in smart cards is currently handled by special applications which are not integrated or related to the browser technology and which contain the suitable interface to the functions and information as used by the type of smart cards supported by such applications. Standard Internet applications cannot access smart card information on the local client system on which such applications are executed. They must rely on host or server recourses from which they are loaded.

SUMMARY OF THE INVENTION

It is an object of the invention to provide a system which permits an easy integration of smart card based resources on client computers into Internet based applications. It is also an object of the invention to handle the smart card access including security functions by a proxy server. It is a further object of the invention to enable a programmer to create user interfaces for applications using smart card data.

According to the invention, as defined in the claims, an Internet proxy server provides integrated smart card access capabilities for data retrieval and upload operations which are subject to a user access check, and providing further plug in support for new applications and application input output support. The proxy server may be readily adapted to any smart card data format.

The solution according to the invention enables seamless and easy integration of smart card based resources and related security function implemented on a client workstation into an Internet based hosting application. The smart card access and security function are handled transparently by the proxy. This solution makes it possible to write applications that use smart card resources in the same way as if they were accessed through and residing in the Internet.

The proxy server presents itself as an application which is loaded on the local computer of a user. One of the proxy servers main functions is to intercept all HTTP data transfers and forward them to the host it was intended for, and basically to do all the work a HTTP proxy server is intended to do. If the user selects a universal resource locator (URL) which contains data files that are supposed to include data from his smart card, the proxy server inserts this data in the reply. This has the advantage that the provider on the Internet does not have to include any security relevant data in the HTML documents, since the critical data are only inserted when the document arrives at the local computer of the user. This operation does not limit or restrict the use of encryption protocols for the transfer of such critical data.

The proxy server is equipped with a local HTTP server so that any documentation or administration can also be presented in an Internet browser installed on the local computer, and in addition a remote access to smart card data can be performed through the network. The proxy server may also be used to encrypt HTTP requests and resend them to another proxy server which, for example, performs bank access and debit functions in a shop.

BRIEF DESCRIPTION OF THE DRAWINGS

In the following an embodiment of the invention is described with reference to drawings which show.

DETAILED DESCRIPTION A PREFERRED EMBODIMENT OF THE INVENTION

Figure 1:
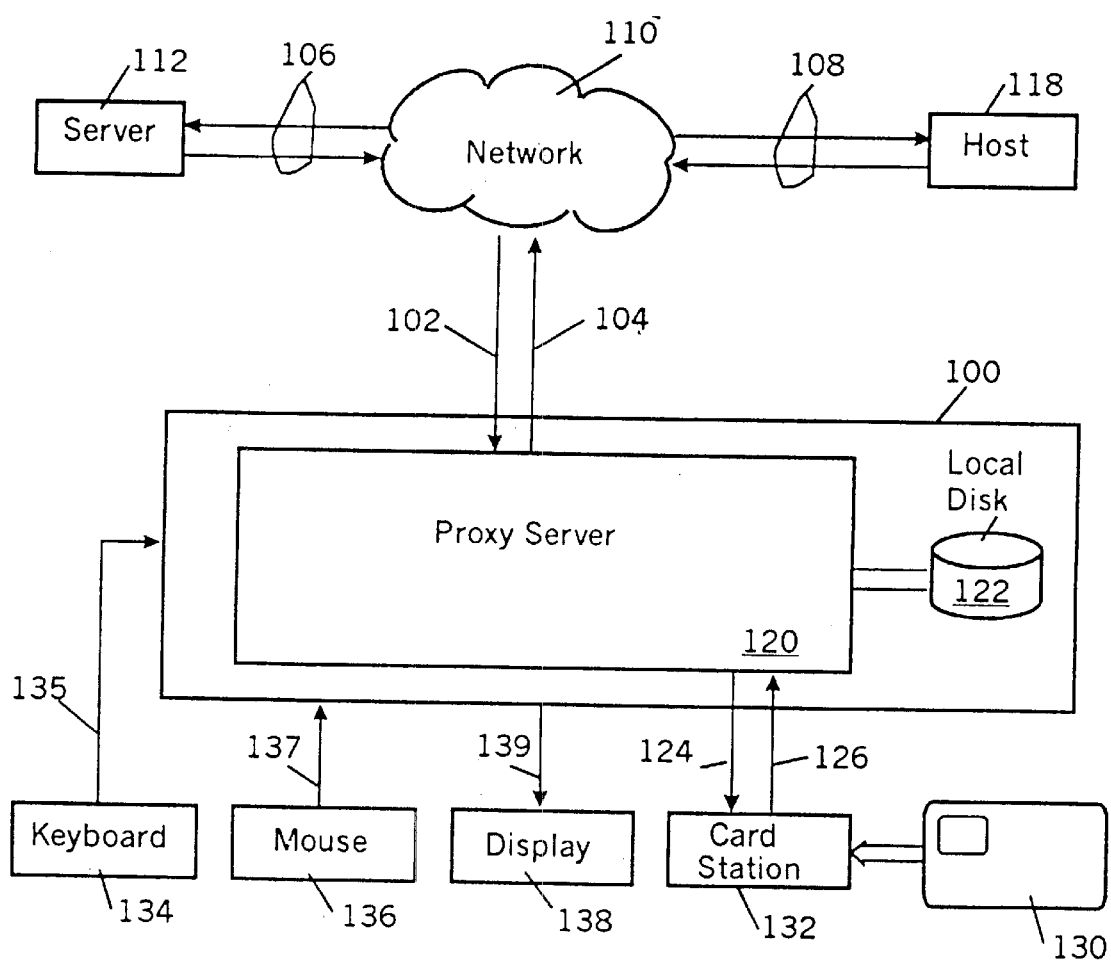
FIG. 1 a schematic block diagram of a system using a proxy server integrated into a network for accessing smart cards according to the invention.

FIG. 1 shows a local processor 100 which may be a work station or a personal computer. The local processor 100 is connected via data communication channels 102, 104 to a Network 110, preferably the Internet, which permits data communication among a plurality of computers. In FIG. 1 a server 112 is connected to the network 110 via communication channel 106 and a host computer 118 is connected to the network 110 via communication channel 108. The local processor 100 may perform a plurality of application programs which are stored on a local storage preferably a local disk 122 and wherein a additional application program may be loaded if required. A proxy server 120 which may be one said application programs supports the access to a smart card 130 by data transfer connections 124, 126. The smart card 130 is inserted into a card station 132 which is attached to the local computer 100. A keyboard 134, a mouse 136 and a display device 138 are also attached to the local computer 100 through suitable connections 135, 137 and 139 and allow input and output of data including smart card requests and responses.

A smart card access is initiated by a user who generates a request for a smart card access by using a network browser, preferably an HTTP browser, running as one of the applications on the local processor 100. Similar smart card access requests may be received by the proxy server 120 via network 110, for example, from server 112. The proxy server 120 functions as an interface between the client and the smart card. The proxy server 120 performs the access to the smart card and the processing of accessed data including the translation of request data into the smart card data format, the human readable representation of data read from the smart card 130, the encoding of smart card upload data, and the generation of a response to the client server 112. The smart card access may be linked to a local access to data stored on the local disk 122 which data may, for example, represent a HTML document wherein data read from the smart card 130 are to be inserted. A document modified in this manner may be part of the response to the request and is communicated to the user by the display device 138.

The proxy server 120 thus supports local data access to applications and data stored on the disk 122 and access to the smart card 130 and the inclusion of data from both sources into existing documents. In addition, the proxy server 120 allows access through the network 110 to data residing in a host or server actively connected to the network such as host 118 and server 112. Seen from the standpoint of the user of an application which requests a HTML document, it does not matter whether the data for this document are derived from the the local disk 122 or the smart card 130 or the network 110.

Figure 2:
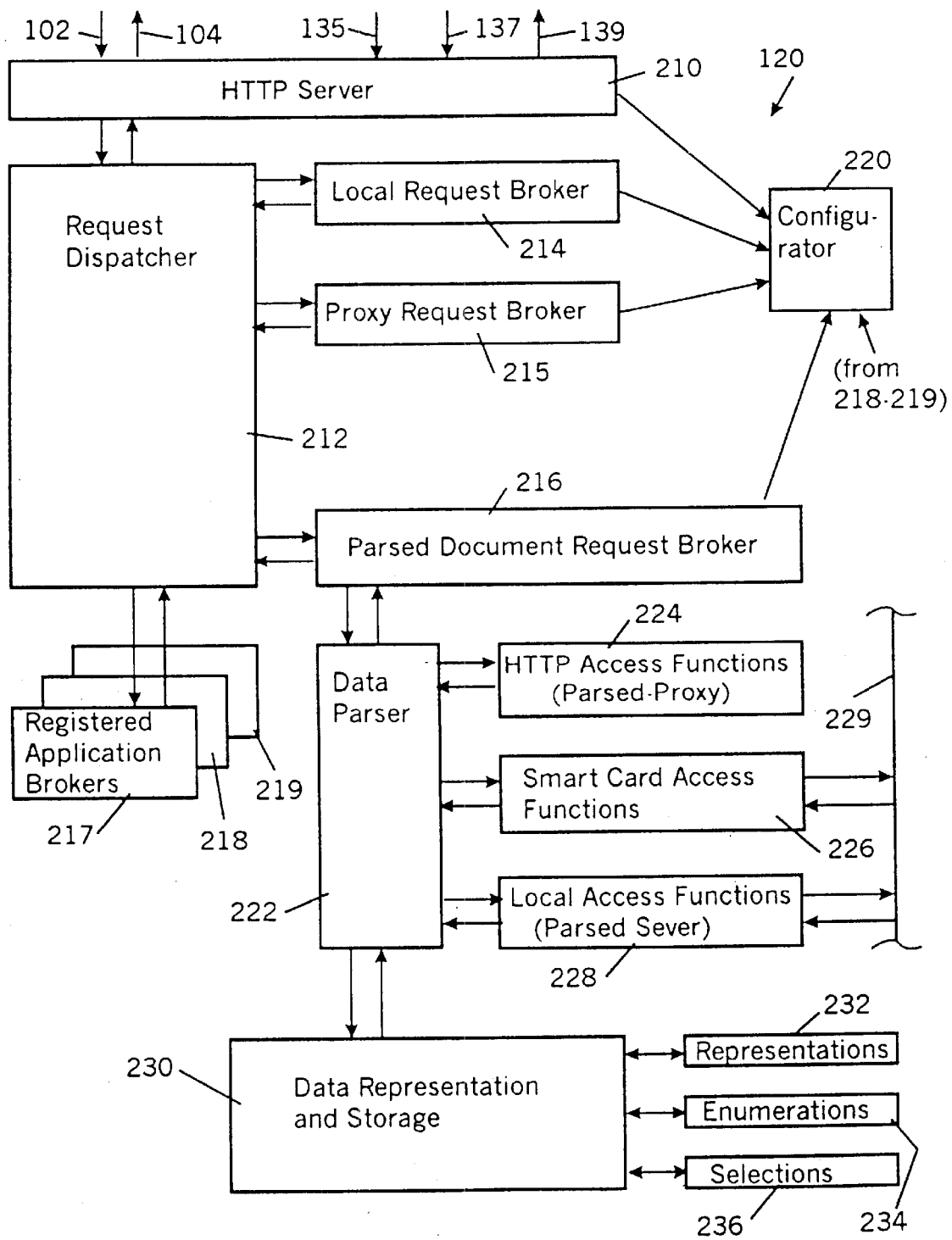
FIG. 2 a schematic block diagram of the proxy server used in the system of FIG. 1.

Components of a preferred implementation of the proxy server 130 are shown in FIG. 2. The components shown and described are preferably implemented in object oriented technology to which only at certain occasions reference is made by referring to corresponding objects and methods. The proxy server 130 comprises an HTTP server 210 which accepts requests that fulfill the HyperText Transfer Protocol (HTTP). Such requests may be generated by using the keyboard 134 and the mouse 136 and a HTTP browser running on the local computer 100. The HTTP server 210 receives the requests, check them for completeness and routes them through to a request dispatcher 212 which evaluates the request elements and checks the correct addressing. The request dispatcher 212 passes every received request to a plurality of request brokers 214–219 and attempts to locate one of these request brokers for handling the request. These brokers comprise a local request broker 214 which attempts to handle every request directed to the local processor 100 and thereby makes the local computer a network server. A proxy request broker 215 redirects requests for non-local servers to their location and thus behaves like a standard non-caching proxy server. A parsed document request broker 216 parses all data of a request for macro-like identifiers and attempts to replace the fields referenced by the identifiers with data from the smart card 130, from a local storage 122 of from other locations such as server 112 or host 118. There are also application brokers 217, 218, 219 each of which is assigned to an application program registered on the proxy server 120. The HTTP server 210 and the brokers 214–219 are connected to a configurator 220 by means of which the required configuration of the proxy is set at the begin of its operation.

The parsed document request broker 216 is connected to a data parser 222 which locates and identifies macros in documents received via the broker 216 or access functions 224, 226, 228, and it executes the identified macros. The data parser 222 initiates the translation of macro information to human readable information and inserts the latter into the documents. HTTP access functions 224 provide transparent access to remote recourses through the network 110. The HTTP access functions 224 operate as a data retrieval method for the data parser 222. The data parser 222 is also linked to smart card access functions 226 which function as an interface to the smart cards 130 and provide access to files stored on smart cards, or upload files to smart cards. The data parser 222 is further linked to local access functions 226 which provide access to files on the local disk 122. The smart card access functions 226 and the local access functions 228 are connected through a data channel 229 to said card station 132 and said local disk 122.

A data representation and storage component 230 which is connected to the data parser 222 activates methods to retrieve, store and modify objects. The data representation and storage component 230 stores objects until they can be saved on the local disk 122 or upload to a smart card 130 or transferred through the network 110 to other locations. The data representation and storage component 230 can translate numerical values into text and translate numerical values back to text. For this purpose the data representation and storage component 230 uses tables 232, 234 and 236. Representations table 232 translates object values into human readable text and does the HTML specific encoding. Enumerations table 234 translates numeric values into corresponding plaintext representations and also translates in counter direction plaintext representations into corresponding numerical representations. Selections table 236 translates representations and selections into a form which is suitable to be used as selector boxes or check boxes in an HTML documents displayed on the display device 138.

The results of the translations performed by the tables 232, 234, 236 are submitted back to the data representation and storage component 230 which stores them until further operations have been completed or sends them immediately back to the data parser 222 for having selected and performed access functions 224, 226 or 228. Completed request response data are provided to the parsed document request broker 218 which transfers these data by means of the request dispatcher 212 through the HTTP server to the display device 138.

The proxy server 120 is started as a normal application. This can be done at any time, after boot, at browser start time, or whenever the user wants. After the start, the proxy server 120 reads a configuration file from the local disk 122 within which all configuration options of the proxy server 120 can be selectively set. After having finished the configuration, the proxy server 120 loads a file wherein all applications which the proxy server is allowed to call are registered. This file contains links to application program files loaded on the local computer, or somewhere at a location integrated into the network 110. The proxy server 120 calls all these application programs to initialize them and adds all those application programs who report back to its active application list. On completion of this loading and initialization task the proxy server 120 is ready to operate.

When a user selects a link on his browser a HTTP request is sent out to the address indicated by the Universal Resource Locator (URL) which is part of the request. The proxy server 120 intercepts this request by its HTTP server 210 and examines the target address and the name of the URL. The proxy server 120 then asks all registered applications if they can handle the request. In the event that one of the registered applications can, the request is handed down to the application and the proxy server 120 returns to its waiting status. This mechanism allows the applications to use the HTTP server 210 as their input/output port.

If the proxy server 120 receives a request and no application wants to handle it, the browser handles the request just as any other proxy server would. It redirects the request to the host it was intended for and returns the response to the browser.

One of the functions of the proxy server 120 is to insert data into HTML documents as they pass through the proxy server. The data to be inserted can come from any resource including the smart card 130. The proxy server 120 parses the document for special tags, which are usually not found in HTML, and replaces them with the appropriate data elements.

Another function of the proxy server 120 is the active redirection. As long as a data field is not set properly, all requests to the network will receive just one special document. This document can be determined by means of the configuration utility.

To prevent others from tampering, the configuration file can be signed. The proxy server will not work correctly if the signature does not match. In this case the proxy server initialization fails and all parser functions are disabled.

Figure 3:
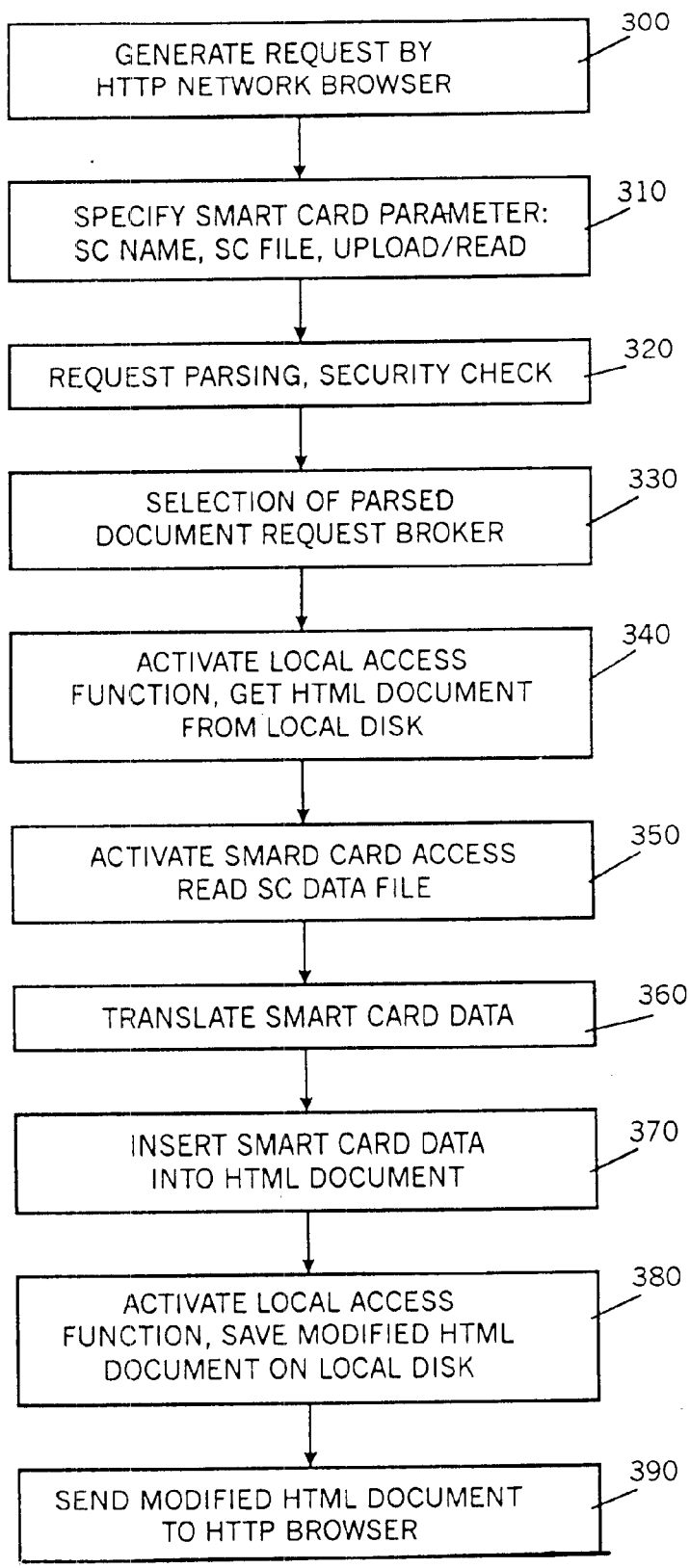
FIG. 3 a flow diagram of method steps according to the invention, the flow diagram relates to the generation of an HTML document by using data from a smart card.

With reference to the flow charts 4–6 the method of operation of the proxy server 120 is explained. FIG. 3 relates to the generation of an HTML document by using data from a smart card. In an initial step 300 the user generates a request by using a HTTP browser such as the Netscape Internet browser. The request may include the name of an HTML document or other document address data. To supplement the request smart card parameters may be specified in step 310. These parameters may comprise the name of the smart card owner and smart card file address data. These data may have the format of a Universal Resource Locator URL. The smart card parameters also specify the access function requested, i.e. whether a smart card file has to be read or a file has to be uploaded. By step 320 the request and the smart card parameters are parsed and made subject to a security check. Step 330 selects the parsed document request broker 216 for further handling the request. In step 340 the local access functions 228 are activated using the document address data specified in the request. The access functions read the addressed file from the local disk 122 and send it to the data parser 222 for further processing. Step 350 activates the smart card access functions 226 to read a data file from the smart card, inserted into station 132, by using the smart card address data generated in step 310. The smart card data file is send to the data parser 222 and stored in the data representation and storage component 230. In step 360 a translation of the smart card data takes place by means of one or more of translation tools such as tables 232, 234, 236. The translation step 360 may decode the smart card data into a human readable representation. This step may also comprise a data decompression and a decryption of encrypted smart card data. The translated data are stored in the data representation and storage component 230 and in step 370 they are included into the document data which are also stored in data representation and storage component 230. The insertions step is performed by the data parser 222 which then submits the completed document to the parsed document request broker 216. In step 380 the local access functions 228 are activated again to save the modified document on the local disk 122, and in step 390 the completed document is sent to the browser which displays the document on the display device 138.

Figure 4:
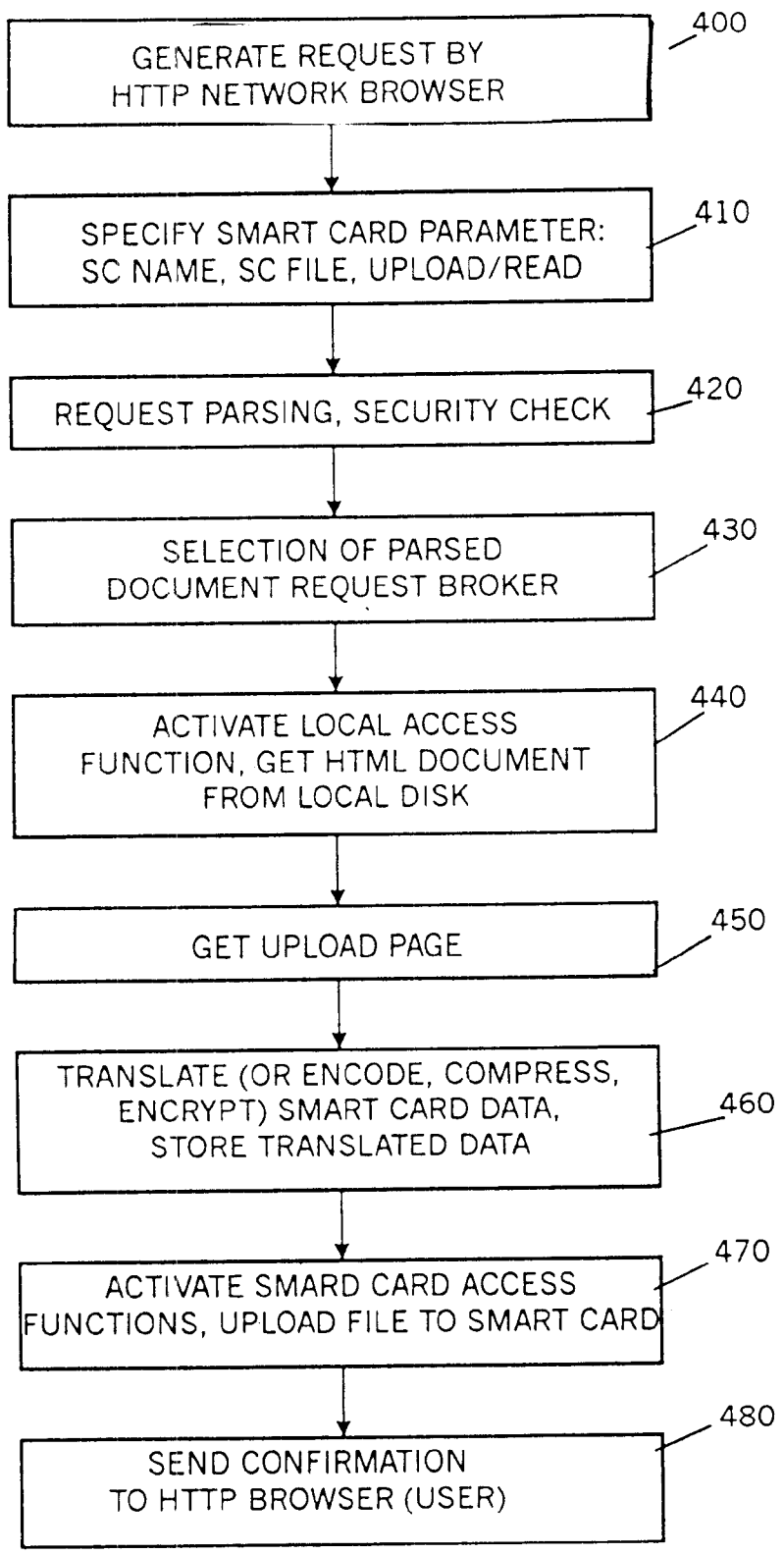
FIG. 4 a flow diagram of method steps according to the invention, the flow diagram relates to the upload of data from an HTML document to a smart card.

FIG. 4 refers to the upload of data from an HTML document to a smart card where the HTML document is stored on the local disk 122 and is specified by a request of the user. The user also identifies the smart card to which data are to be uploaded. For these purposes steps 400, 410, 420, 430 and 440 are performed which correspond to the steps 300, 310, 320, 330 and 340 of FIG. 3. In step 450 the accessed HTML document is used to determine the upload data and to generate an upload page which is stored in the data representation and storage component 230. Step 460 translates the upload data from the HTML document into the smart card format. This step may be performed by means of the tables 232, 234, 236. The translation step may also comprise a compression or encryption of the upload data. Step 470 performs an access to the smart card by activating the smart card access functions 226 to write the upload data to the smart card. Step 480 sends a confirmation on the completion of the upload operation to the browser.

Figure 5:
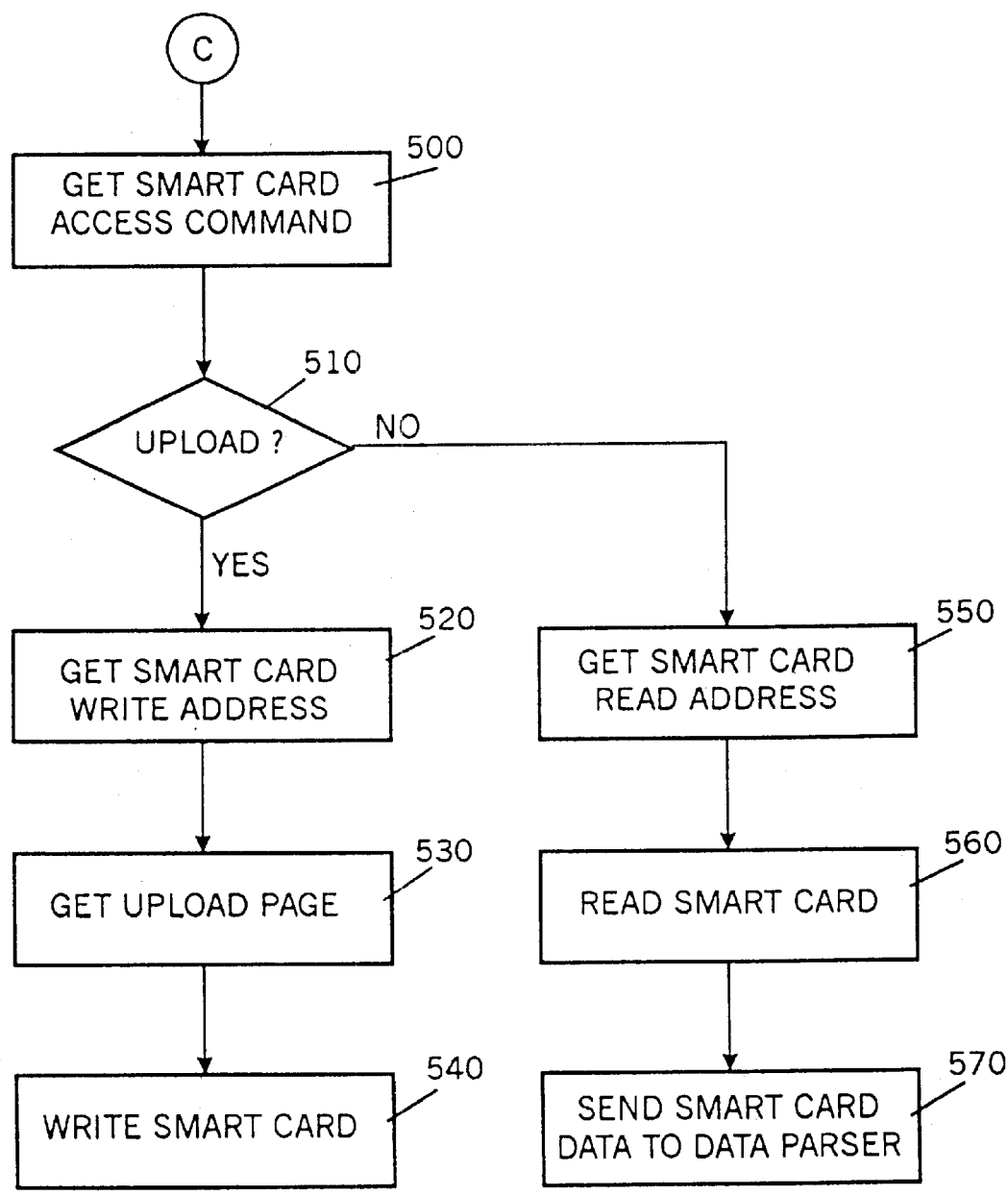
FIG. 5 a flow diagram which show the write/read control part of a smart card access operation.

FIG. 5 shows the write/read control part C of a smart card access operation. In step 500 the smart card access command from the request parameters is interpreted by the data parser 222. Step 510 determines whether the access relates to an upload (write) operation steps 520, 530 and 540 or a read operation steps 550, 560 and 570. In case of an upload, step 520 makes available the write file address to the smart card access functions 226 and step 530 gets the upload page from the data representation and storage component 230 where it was stored after its generation as described with reference to FIG. 4. Write smart card step 540 performs the upload by using the data established by steps 520 and 530.

Figure 6:
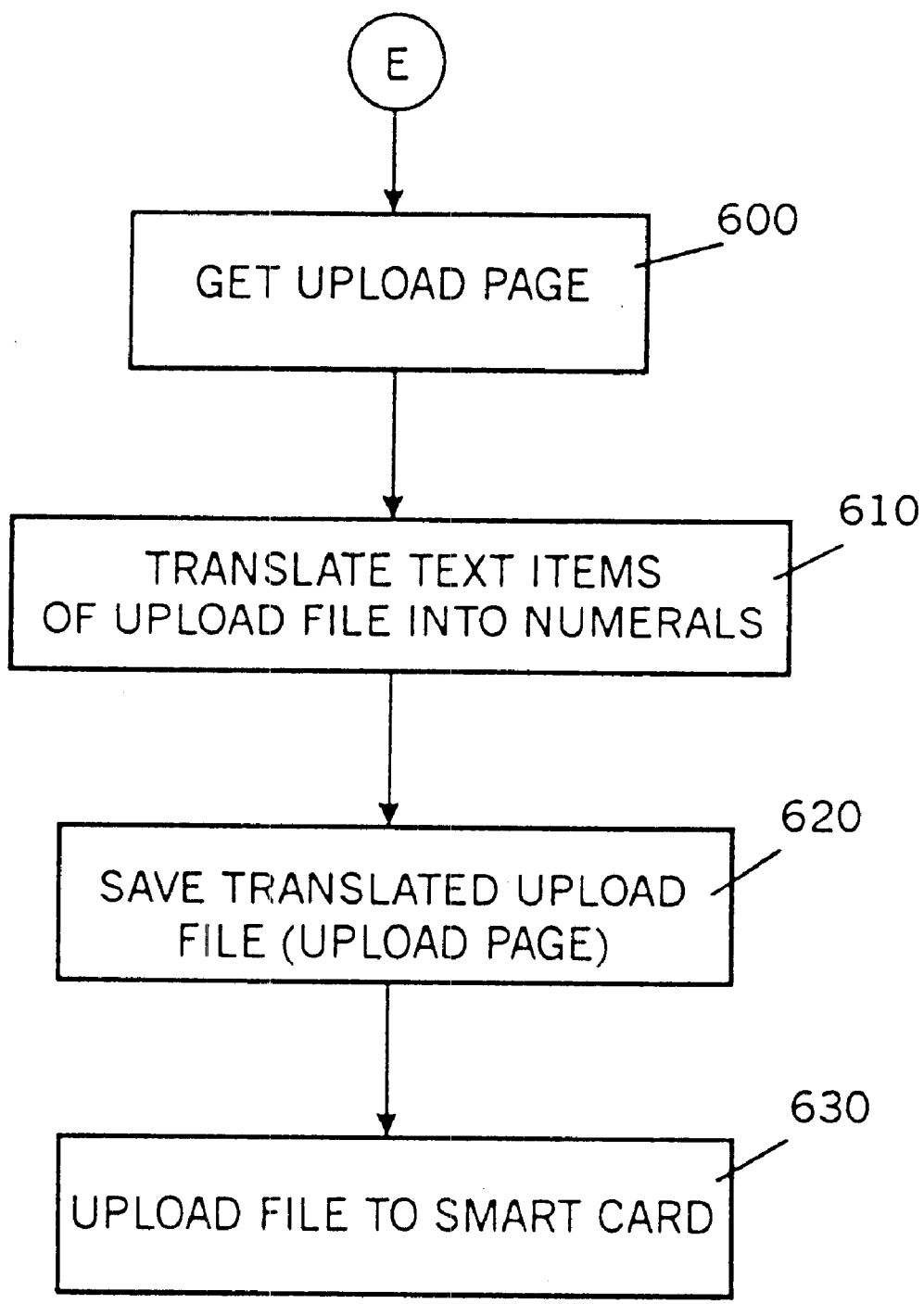
FIG. 6 a flow diagram of the translation HTML document data into a smart card data format.

An example of the translation steps 360 and 460 of FIGS. 3 and 4 is shown in FIG. 6. The sequence of steps shown in FIG. 6 are designated as part E which relates to the operation of the enumeration table 234 of FIG. 2. Step 600 gets the upload file, for example, by an access to the local disk 122. In step 610 the translation of text items is performed by means of enumeration table 234 (FIG. 2). For example, the name of the month "April" in the designation of a date which may be 530.

An example of the translation steps 360 and 460 of FIGS. 3 and 4 is shown in FIG. 6. The sequence of steps shown in FIG. 6 are designated as part E which relates to the operation of the enumeration table 234 of FIG. 2. Step 600 gets the upload file, for example, by an access to the local disk 122. In step 610 the translation of text items is performed by means of enumeration table 234 (FIG. 2). For example, the name of the month "April" in the designation of a dte which may be included in the upload document is translated into a corresponding numeral which in this example may be "4". In step 620 the translated upload file is stored at once or in successive operations in the data representation and storage component 230. Step 630 writes the translated upload file to the smart card as described before with reference to FIG. 4.

The enumeration table 234 as well as the other translation tables 232 and 236 may be generated or modified according to the smart card type to be used. This can also be done by having prepared and stored a plurality of different sets of translation tables on the local disk 122 from where the configurator 220 selects a suitable set of translation tables at the begin of an operation of the proxy server 120.

While the invention is described with reference to a preferred embodiment, modifications or other embodiments of the invention are within the scope of the invention as defined in the claims.

What is claimed is:

1. A system including a host computer and a server for accessing and processing information on the internet contained in a smart card by a local processor which includes a HTTP browser application; local storage means for storing applications and data; and means for accessing information contained in the smart card and in the local storage, characterized by an internet proxy server means running as an application in the local processor for processing access requests to data stored in the local storage and on the smart card, said proxy server means comprising:

(a) means for receiving access requests generated by means of the HTTP browser application;

(b) means for parsing said smart card access requests;

(c) means responsive to said request parsing means for activating access functions to perform an access to the local storage and to a smart card; and (d) means responsive to said local storage and smart card accessing means for translating data read from the smart card into a data format corresponding to a user interface, and for translating data to be uploaded to said smart card into a predetermined smart card data format.

2. A system according to claim 1, comprising means for generating smart card access request to said proxy server.

3. A system according to claim 1, comprising data modification means for modifying a data representation of documents accessed in the local storage and of data files read from said smart card or to be uploaded to said smart card.

4. A system according to claim 3, wherein said data modification means performs a translation of a data representation.

5. A system according to claim 3, wherein said data modification means performs a translation of numerical data into text data and text data into numerical data.

6. A system according to claim 3, wherein said data modification means performs a translation of selection data from a smart card format into a user interface format, and of selection data from in a user interface format into a smart card format.

7. A system according to claim 5, wherein said data modification means performs a data compression and decompression.

8. A system according to claim 3, wherein said data modification means performs a data encryption and decryption.

9. A system according to claim 8, wherein said data modification means are stored on the local storage and the system comprises means for selecting a certain set of functions to be performed by said data modification means before the proxy server means starts processing of a smart card request.

10. A method for accessing and processing information contained in a smart card connected in a network containing a host and a network server by using a local processor which includes a HTTP browser application; a local storage for storing applications and data; and means for accessing information stored in the smart card and in the local storage means, the method is characterized by the steps:

(a) processing access requests to data stored in the local storage and on the smart card by a proxy server application running on said local processor;

(b) receiving smart card and access requests that are generated by means of the HTTP browser application;

(c) parsing said smart card access request;

(d) in response to the request parsing step accessing the local storage and a smart card; and (e) in response to the accessing step translating data read from the smart card into a data format corresponding to a user interface, and translating data to be uploaded to said smart card into a predetermined smart card data format.

11. A method according to claim 10, wherein said access requests processing step is executed by an Internet proxy server running as an application on said local processor.

12. A method according to claim 10, including the step of generating smart card access requests to said proxy server running on the local processor.

13. A method according to claim 12, wherein said request generating step is performed by using a HTTP browser application running on said local processor.

14. A method according to claim 10, including the step of modifying a data representation of documents accessed from the local storage and of data files read from said smart card or to be upload to said smart card.

15. A method according to claim 14, wherein the data modifying step performs a translation of a data representation.

16. A method according to claim 14, wherein the data modifying step performs a translation of numerical data into text data and text data into numerical data.

17. A method according to claim 14, wherein the data modifying step performs a translation of selection data from a smart card format into a user interface format and of selection data from in a user interface format into a smart card format.

18. A method according to claim 14, wherein the data modifying step performs a data compression and decompression.

19. A method according to claim 14, wherein the data modifying step performs a data encryption and decryption.

20. A method according to claim 14, wherein software for a plurality of predetermined modifications to be performed by the data modification of a data representation of documents step are stored on the local storage and the method of claim 16 includes the step of selecting a certain set of the modifications before the proxy server performs the processing of a smart card request.

21. A program product stored on a data carrier for accessing and processing information contained in a smart card over a network with a server and a host computer by using a local processor which includes a local storage for storing applications and data and means for accessing information contained in the smart card and in the local storage, the program product comprising:

(a) software for processing access requests to data stored in the local storage and the smart card by a proxy application running on said local processor;

(b) software for receiving a HTTP browser generated smart card access request;

(c) software for parsing said smart card access request;

(d) software for responding to the request parsing step accessing the local storage and a smart card; and (e) software for responding to the accessing step translating data read from the smart card into a data format corresponding to a user interface, and translating data to be uploaded to said smart card into a predetermined smart card data format.

22. A method according to claim 10, including the step of using the proxy server application for processing requests received over the internet for data stored on the smart card.

23. A method according to claim 10 including the step of using the proxy server application for processing requests received from the network server over the internet to access data stored the smart card.

24. A method of claim 12 including the step of using the proxy server application for processing requests received from the host over the internet to access data stored in the smart card.

25. A program product according to claim 21, wherein the software for processing access requests is for execution by an Internet proxy server running as an-application on said local processor.

26. A program product according to claim 21, including software for generating smart card access requests to said proxy server running on the local processor.

27. A program product according to claim 26, wherein the software for generating smart card requests is a HTTP browser application running on said local processor.

28. A program product according to claim 21, including software for step of modifying a data representation of documents accessed from the local storage and of data files read from said smart card or to be upload to said smart card.

29. A program product according to claim 28, wherein said software for modifying the data performs a translation of the data representation.

30. A program product according to claim 28, wherein said software for modifying the data performs a translation of numerical data into text data and text data into numerical data.

31. A program product according to claim 28, wherein said software for modifying the data performs a translation of selection data from a smart card format into a user interface format and of selection data from in a user interface format into a smart card format.

32. A program product according to claim 28, wherein said software for modifying the data performs a data compression and decompression.

33. A program product according to claim 28, wherein said software for modifying the data performs data encryption and decryption.

34. A program product according to claim 28, wherein the software for modifying the data includes a plurality of predetermined modification processes and the program product includes software for selecting a certain set of the modification processes before the proxy application starts processing of a smart card request.

* * * * *